United States Patent
Hanson

(10) Patent No.: US 6,516,194 B2
(45) Date of Patent: Feb. 4, 2003

(54) SYSTEM FOR CONTROLLING AND MONITORING A WIRELESS ROAMING CALL

(75) Inventor: Daniel A. Hanson, Dallas, TX (US)

(73) Assignee: VeriSign, Inc., Mountain View, CA (US)

( * ) Notice: Subject to any disclaimer, the term of this patent is extended or adjusted under 35 U.S.C. 154(b) by 0 days.

(21) Appl. No.: 09/794,802

(22) Filed: Feb. 27, 2001

(65) Prior Publication Data

US 2001/0031636 A1 Oct. 18, 2001

Related U.S. Application Data

(60) Provisional application No. 60/186,067, filed on Feb. 29, 2000.

(51) Int. Cl.⁷ ........................... H04Q 7/20; H04M 11/00
(52) U.S. Cl. ........................ 455/433; 455/407; 455/422; 455/432
(58) Field of Search ................................ 455/433, 432, 455/435, 422, 407, 437, 560

(56) References Cited

U.S. PATENT DOCUMENTS

| | | | |
|---|---|---|---|
| 5,278,890 A | * | 1/1994 | Beeson, Jr. et al. |
| 5,289,179 A | * | 2/1994 | Beeson, Jr. et al. |
| 5,309,501 A | * | 5/1994 | Kozik et al. |
| 5,592,533 A | * | 1/1997 | McHenry et al. |
| 5,754,955 A | * | 5/1998 | Ekbatani ..................... 455/422 |
| 5,815,810 A | * | 9/1998 | Gallant et al. ............... 455/433 |
| 5,915,220 A | | 6/1999 | Chelliah |
| 5,946,623 A | | 8/1999 | Spradin |
| 5,953,662 A | * | 9/1999 | Linquist et al. ............. 455/433 |
| 5,978,678 A | | 11/1999 | Houde et al. |
| 6,002,932 A | | 12/1999 | Kingdon et al. |
| 6,029,062 A | | 2/2000 | Hanson |
| 6,035,025 A | | 3/2000 | Hanson |
| 6,058,300 A | | 5/2000 | Hanson |
| 6,070,067 A | * | 5/2000 | Nguyen et al. ............. 455/407 |
| 6,119,001 A | * | 9/2000 | Delis et al. ................. 455/433 |
| 2001/0031636 A1 | * | 10/2001 | Hanson ....................... 455/432 |

* cited by examiner

Primary Examiner—William Cumming
(74) Attorney, Agent, or Firm—Kenyon & Kenyon

(57) ABSTRACT

The invention is a Roaming Solution network system, the system including a Roaming Server, a National Location Register, and an 800 number Remote Switching Unit. The system is integrated with a standard SS7 type telecommunications network and further coupled to an account based billing and call control platform that allows registered wireless credit limited subscribers to place and receive calls when roaming outside of their Home Provider's network. The invention verifies that the wireless subscriber's account balance is sufficient to place or receive the call, translates the account balance into talk minutes, and monitors the call for talk duration. The Roaming Solution network system is further operable such that if the wireless subscriber exceeds the available account balance, the system tears down the call in the first negative minute and immediately decrements the wireless subscriber's account. If the call is disconnected prior to the account balance being depleted, the invention immediately decrements the wireless subscriber's account and releases the trunks. This Roaming Solution network system is designed to mitigate a Home Provider's exposure to credit risk when providing roaming services to credit limited subscribers.

10 Claims, 13 Drawing Sheets

SYSTEM FOR CONTROLLING AND MONITORING A WIRELESS ROAMING CALL

CROSS REFERENCE TO RELATED APPLICATION

This application is based on and claims priority of Provisional Patent Application Ser. No. 60/186,067 of Daniel A. Hanson, for SYSTEM AND METHOD FOR WIRELESS ROAMING, filed Feb. 29, 2000, which is hereby incorporated by reference.

BACKGROUND OF INVENTION (1) Field of the Invention

This invention relates generally to the field of telecommunications, and more particularly, to a telecommunications system for controlling and monitoring wireless roaming calls for real-time billing, specifically, wireless roaming calls having credit restrictions.

(2) Background Art

The telecommunications industry has transitioned to a wireless telecommunications environment with the introduction of wireless telecommunications services (referred to as "wireless services" or simply "wireless"). This transition has resulted in a rise of a myriad of wireless providers who seek to service the growing number of wireless subscribers on a national level, as well as a worldwide level. Providing the wireless subscribers with the ability to place and receive wireless communications regardless of their geographic location is not only a technical challenge, but also requires a complex network and infrastructure. A wireless subscriber may wish to place or receive wireless telecommunications when geographically outside the subscriber's home network. The "home network" is the network or the region serviced by the network of the wireless provider with whom the subscriber has contracted. The wireless provider, however, also wishes to provide telecommunications services to the subscriber even when the subscriber is geographically outside the home network, commonly referred to as roaming outside the home network or simply roaming. The subscriber must be capable of communicating outside of the home network in order for a Roaming Solution to occur.

However, to provide this service creates a credit risk for the Provider because calls originated by or delivered to the roaming subscriber while roaming in a Local Roaming Provider's network can not be controlled or monitored real-time for account based billing. Due to this potential exposure to credit risk, the wireless providers have, in many cases, refused to provide roaming services to many subscribers in order to mitigate exposure to credit risk. Other solutions to mitigate exposure to credit risk include, credit card calling, various prepay systems including the Applicant's patented system which provides roaming services to prepay unregistered roaming subscribers for call originations only.

When the subscriber is outside of the home network, the subscriber's equipment searches for a Local Provider's network (local with respect to a roaming subscriber, "Local Provider" could be referred to as "Roaming Provider" or "Serving Provider") for which it can communicate. This is referred to as roaming. The subscriber's equipment roams until a network provider for which communications can be established is found. The myriad of providers and the growing number of subscribers combined with the complex infrastructure makes a network Roaming Solution a key part to successfully providing nationwide or worldwide wireless services.

Wireless communication networks and services must provide a Roaming Solution for roaming Registration Notification (Regnot), as well as Roaming Solutions for wireless communications originated by the wireless roaming subscriber and for incoming communications directed to the wireless roaming subscriber. There are various wireless telecommunications interconnect strategies that are designed for servicing the wireless roaming subscriber. A given wireless provider will service both local home subscriber traffic, specifically their own subscribers, however, they will also service roaming subscribers who are not their own who have roamed into the Local Provider's network (i.e., a wireless roaming subscriber).

As indicated above, wireless subscribers desire to be able to use their mobile phone regardless of their location and this subscriber desire has induced wireless providers to negotiate contracts among themselves to provide roaming services to their subscribers when they are outside the wireless Home Provider's network. A subscriber is considered a roamer when the subscriber's mobile station or mobile phone requires service in a local network which is operated by a wireless provider other than the one to which the subscriber contracts. When a subscriber's mobile station is in the roaming mode, a signal indicative of the roaming condition is provided to the subscriber and is typically displayed on the display of the mobile phone as the result of a comparison of the system identification (SID) of the subscribed system which is stored in the mobile station (mobile phone), with the SID of the system of the Local Wireless Provider which provides a service broadcast from the local base station. This alerts the subscriber of the mobile station that the service being provided is accruing roaming charges. However, the subscriber typically does not have visibility into the actual roaming costs as the contracts between the various wireless providers can vary. Thus, a subscriber can accumulate roaming costs that are higher than anticipated.

A typical scenario is when the mobile station or mobile phone of the wireless subscriber enters a geographical area outside of its home network that prevents it from obtaining service from the Home Provider's communications network. The mobile station or the mobile phone registers with the Local Provider's (Roaming Provider's) wireless communications system by providing identification information to the Local Provider's mobile switching center (MSC). This identification is referred to as Regnot. The Visitor Location Register (VLR) attached to the Local Provider's MSC has a database of information that identifies other providers with whom they have billing arrangements such that the Local Provider has agreed to provide roaming services to roaming subscribers of the other provider (the Home Provider of roaming subscriber). The VLR maintains records of all service being provided to wireless roaming subscribers. If the other provider or Home Provider of the roaming subscriber is registered in the VLR of the Local Provider, then the VLR will contact the Home Location Register (HLR) of the Home Provider of the roaming subscriber to obtain caller profile information for the roaming subscriber that has roamed into the network of the local or Roaming Provider. The Local Wireless Provider's wireless communications system will then seek authorization to provide service to the roaming subscriber who has roamed into the Local Wireless Provider's network. The HLR of the Home Provider will tell the VLR of the Local Provider whether to provide or not to provide roaming services. Once the roaming services are allowed to be provided, all calls originated by the roaming subscriber are completed by the Local Provider's MSC and RSU. The problem is that the Home Provider has no control over the call originated by the roaming caller. This situation creates a credit risk to the Home Provider. Therefor, Home Providers have opted not to allow roaming services to some subscribers thus they would not be registered with the VLR of the Roaming Provider. Please note, in the telecommunications industry when one refers to a Provider's mobile switching center or switching center or mobile switch or simply switch, it typically implies that an HLR and VLR are included, as well as other necessary hardware. For the purpose of this document, when these terms are used it is implied that the HLR and VLR are included.

Call delivery to the roaming subscriber when roaming in a Local or Roaming Provider's network can be accomplished current wireless telecommunication infrastructures, however, once the call is terminated at the MSC of the Local Provider, the Home Provider has no means of controlling and monitoring the call. Again, Home Providers have opted not to allow roaming services to some subscribers and again they would not be registered with the VLR of the Roaming Provider.

If the roaming subscriber is identified in the VLR of the Local Provider, the system of the Local Wireless Provider will send a request to provide service to the home wireless provider's system controller which contains a database referred to as a HLR. The HLR contains user profile information comprising an authorization to permit roaming, user features and information about anticipated roaming costs based upon the various contractual agreements that are in place. The home wireless provider system will then provide information back to the Local Wireless Provider system, including authorization to permit roaming, as well as other features.

The Applicant has reduced to practice and implemented patented technology that provides real-time call management of a call originated by an unregistered prepay roaming subscriber which addresses part of the problem discussed above, specifically call origination from an unregistered prepay roaming caller. This is an option for those subscribers that the Home Provider has opted not to register with the Local Provider for roaming services. With this technology an unregistered prepay roaming subscriber (a subscriber that the Home Provider opted not to register with the VLR of the Local Provider but is a prepay subscriber) can originate a prepay call. For example, U.S. Pat. No. 6,029,026, issued Feb. 22, 2000, to the present Applicant discloses a network that provides such a service. This patent discloses and claims a telecommunications system that includes a prepay call management platform which is coupled and co-located with a Local Roaming Provider's telecommunications MSC. The system further includes a customer database coupled to the prepay call management platform for storing prepay customer data. The system provides a method for live call management of all prepay calls with unregistered roaming call processing capability. The method includes the steps of recognizing an unregistered roaming call at a Roaming Provider's telecommunications MSC and routing the unregistered roaming call to a prepay call management platform coupled to the telecommunications MSC. This system allows for unregistered roaming calls to be processed locally. This system provides for prepay call management accounting, however, this technology requires the Local or Roaming Provider to have additional hardware infrastructure communicable to and co-located with the Roaming Provider's MSC. The additional infrastructure required includes a Remote Switching Unit (RSU) for terminating the prepay roaming calls. In addition, this patented system only provides for call origination services and not call delivery services (incoming calls directed to the roaming subscriber while in a local network).

The Regnot of the roaming subscriber that occurs is logged with the home wireless providers system also, which allows the home wireless provider to be aware of the subscriber's location such that the home wireless provider is able to reroute all incoming calls to the Local Provider's MSC for final termination at the subscriber's mobile station. If the mobile station of a subscriber roams from a previously visited provider's network MSC to a newly visited MSC, or back to the Home Provider's network MSC, the home MSC notifies the previously visited MSC to clear any data regarding that mobile station from its system. This process of tracking for call delivery to the roaming caller and actual delivery of the call terminating at the Local Provider's switch is not addressed by the Applicants patented system for account billing.

In summary there are several shortcomings of the standard wireless communication networks. For example, one shortcoming of the standard network is calls delivered to the roaming subscriber can not be controlled or monitored. Another shortcoming of the standard network is that calls originated by the roaming subscriber either cannot be monitored and controlled at all or if monitoring and control is provided additional infrastructure is required at the Roaming Provider's Site. There is a need in wireless to address the credit risk of some roaming subscribers and provide a system such that wireless providers can provide wireless roaming services to credit risk subscribers while mitigating the credit risk.

BRIEF SUMMARY OF INVENTION

The invention is a wireless telecommunications Roaming Solution that includes a Regnot function, a roaming call origination function, and a roaming call delivery function. The Roaming Solution integrated with a real-time account billing system equips the Home Provider with the capability to monitor, control and real-time price calls originated by and delivered to credit risk roaming subscribers, for example, prepay roaming subscribers. The Roaming Solution defines a network architecture that comprises multiple network components, including a Roaming Server which acts as a gateway between a National Location Register (NLR), which is also a part of the Roaming Solution, and a call origination remote switching unit. The call origination remote switching unit or the 800 number Remote Switching Unit (800# RSU) is where the wireless roaming call originations will be processed through for central control, which can be generally referred to as a central control RSU or a call origination RSU. The Roaming Server also acts as a gateway between the NLR and an account based billing system to which the Roaming Solution is coupled. The NLR acts as a VLR as seen by the HLR of the Home Provider, and acts as a HLR as seen by the VLR of the Local Roaming Provider. This is accomplished by the NLR tapping into or inserting in the communication link between the HLR of the Home mobile switch and the VLR of the roaming serving mobile switch. The NLR is communicably positioned to intercept messages from the VLR and the HLR. The NLR tracks the location information for the wireless roaming subscribers and contains the HLR information, which provides the subscriber profile information. The NLR and Roaming Server are adapted to be communicably integrated with a standard and unmodified wireless communication network having a home MSC which provides transport and translation support for call originations at the wireless roaming subscriber, and several roaming serving MSCs which provide transport and translation support for terminations to the wireless roaming subscriber. The NLR and Roaming Server is further adapted to be communicably integrated with a real-time billing system such that all roaming calls can be monitored, controlled and real-time pricing and accounting. Thus, Roaming Solution Network System comprises three components and they are the Roaming Server, the NLR and the call origination RSU (800# RSU). Each of these components are adapted such that they can be located at a central location remote from either the Home provider or the Serving Provider.

One aspect of the present invention is that all-call originations from wireless credit risk roaming subscriber's can be supported and call monitoring and control will be provided. The real-time call monitoring and control provided by the Roaming Server, and NLR, integrated with a real-time account billing system mitigates, the Home Providers exposure to credit risk. During the Regnot process, the NLR software captures the roaming serving MSCID and provides this to the Roaming Server for use in subsequent rating of call originations. Furthermore, during call origination, the NLR software captures the calling subscribers MIN and dialed digits. This will be provided to the Roaming Server for subsequent use by the centralized 800# RSU in setting up the call to the called party. In response, the NLR software receives a unique dialed number DN for use by the roaming serving MSC to extend the originating call to the 800# RSU. During this aspect of the invention, call termination to the wireless roaming subscriber can be disabled. The centralized location of the Roaming Solution components specifically the NLR, Roaming Server, and the Call Origination RSU alleviates the need for specialized roaming platforms to be co-located at the serving switch to service unregistered prepay roaming subscribers because now they can be registered.

Another aspect of the present invention is the supporting of call delivery to the wireless credit risk roaming subscribers. Again, due to the Roaming Solution of the present invention, the Home Provider's exposure to credit risk is mitigated. When an incoming call directed to a wireless credit risk roaming subscriber arrives at the home MSC, the MSC routes the call to the RSU of the billing system, which can be referred to as the account billing system RSU. The Account billing system RSU of the billing system queries the Market Server, requesting call validation and then requests from the Roaming Server a temporary local directory number (TLDN) to the Roaming Server MSC. The Roaming Server forwards the request to the NLR. Subsequently, upon request from the Roaming Server, the NLR software will obtain a TLDN from the roaming serving MSC using a route request (ROUTEREQ) message and response. The RSU integrated with the billing system interacting with the Roaming Server utilizes the TLDN to originate a call to the roaming serving MSC for the wireless roaming subscriber. Upon call termination, the call segments from the calling party to the RSU and from the RSU to the called wireless roaming subscriber will be bridged in the RSU integrated with the billing system. As noted above, the NLR software can disable call termination to a wireless roaming subscriber during Regnot. However, when a call to the wireless roaming subscriber is received, the NLR software sends a QUALDIR message to the roaming serving MSC to enable call termination to the wireless roaming subscriber. Upon call disconnect, the Roaming Server will inform the NLR software which then disables call terminations to the wireless roaming subscriber. Please note that the NLR does not take into account the fact that the wireless roaming subscriber has been handed off from its home MSC to a roaming serving MSC or from the serving MSC to its home MSC during a single call instance.

The invention includes the ability to communicate with an account-based billing and call control platform that allows registered prepaid wireless subscribers to place and receive calls when roaming out of their providers'home networks. The invention verifies that the prepaid wireless subscriber's account balance is sufficient to place or receive the call, translates the account balance into talk minutes, and monitors the call for talk duration. If the prepaid wireless subscriber exceeds the available account balance, the invention tears down the call in the first negative minute and immediately decrements the prepaid wireless subscriber's account. If the call is disconnected before the account balance is depleted, the invention immediately decrements the prepaid wireless subscriber's account and releases the trunks.

The present invention as described above remedies the short coming of wireless networks that are unable to service high credit risk roaming subscribers without exposing the Home Provider to unacceptable credit risk. The previously unregistered prepay wireless roaming subscriber requiring an unregistered prepay Roaming Solution can now be transitioned to registered account based wireless roaming subscribers. Also, these account based subscribers can be prepay or optionally a credit limited subscriber. These and other advantageous features of the present invention will be in part apparent and in part pointed out herein below.

BRIEF DESCRIPTION OF THE DRAWINGS

For a better understanding of the present invention, reference may be made to the accompanying drawings in which.

DETAILED DESCRIPTION OF INVENTION

Figure 1:
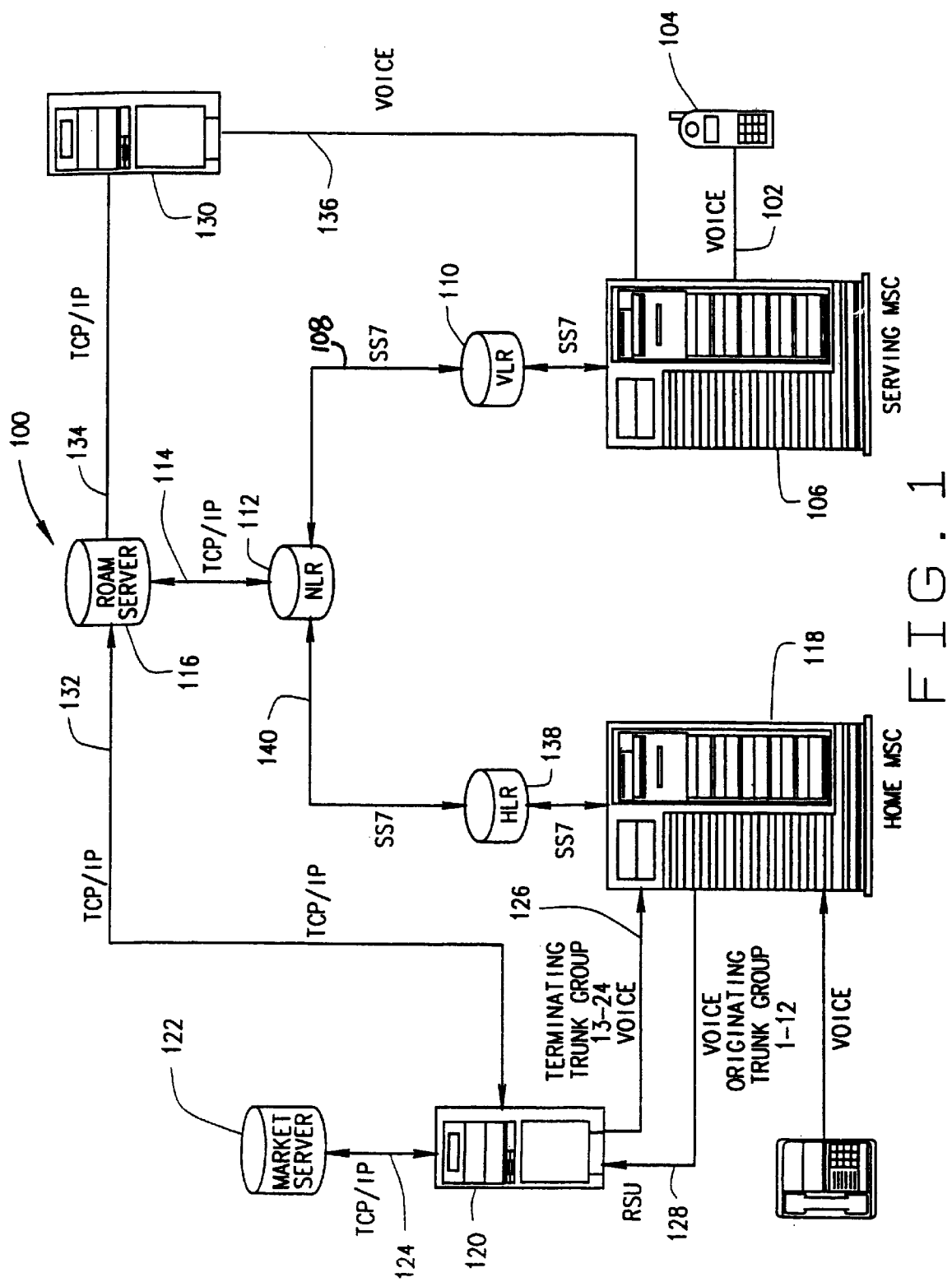
FIG. 1 is an overall diagram of the Roaming Solution network architecture integrated with a standard SS7 communication network and an account based billing system.

According to the embodiment(s) of the present invention, various views are illustrated in FIGS. 1–13 and like reference numerals are being used consistently throughout to refer to like and corresponding parts of the invention for all of the various views and figures of the drawing. Also, please note that the first digit(s) of the reference number for a given item or part of the invention should correspond to the figure number in which the item or part is first identified.

One embodiment of the present invention comprises a Roaming Solution system further comprising a Roaming Server and a NLR, and an 800# RSU where the system is adapted to be communicably connected to a standard telecommunications network having a typical Home Provider Infrastructure and a plurality of Roaming Provider Infrastructures, and where the Roaming Solution system is also adapted to be communicably connected to a realtime account billing system having a Market Server and a RSU. The Roaming Solution teaches a novel system and method for providing credit limited wireless roaming services to high credit risk roaming subscribers while mitigating Home Provider exposure to credit risk. The Roaming Solution further allows the Home Provider to make a decision to register the high credit risk roaming subscriber with a plurality of Roaming Provider partners without a fear of substantial credit risk.

The details of the invention and various embodiments can be better understood by referring to the figures of the drawing. Referring to FIG. 1, an overall network architecture 100 for the wireless Roaming Solution is shown. The network architecture is designed to provide a seamless Roaming Solution. Communication links or paths are shown between the various components of the network. Voice communication paths are indicated as such, for example, voice link 102 between the mobile station or mobile phone 104 and the roaming serving MSC 106. SS7 communication links are also shown, for example, SS7 communication link 108 between the VLR 110 and the NLR 112. TCP/IP communication links are also shown, for example, TCP/IP communication link 114 between the NLR 112 and the Roaming Server 116. A typical SS7 telecommunications network architecture comprises a Roaming Serving MSC 106 that is coupled to a VLR by an SS7 link and that is located at the location of roaming and the network architecture further comprises a home MSC 118 that is coupled to a HLR by an SS7 link and is located at the home location of the wireless roaming subscriber. The network architecture can also include a local billing system RSU 120 that is local to the home location of the wireless roaming subscriber and the local RSU acts as an adjunct switch which controls the wireless roaming call for real-time account billing. The network can also include a Market Server 122 where the rating engine resides for real-time account billing and where the database for the high credit risk subscribers resides. The Market Server and the local billing RSU can be communicably linked by a standard TCP/IP link. The RSU is further communicable with the home MSC via voice links 126 and 128.

The network can be equipped with a novel Roaming Solution network system that comprises a Roaming Server 116, an NLR 112 and an 800# RSU 130 (call origination RSU). The Roaming Solution system is communicably linked through the Roaming Server 116, to the local billing system RSU 120 by a standard TCP/IP link 132, which provides a communicable link to the real-time call monitor and control system for real-time account billing. The components of the Roaming Solution are interconnected by standard TCP/IP links 114 and 134. The 800#RSU has a voice link 136 to the Roaming Provider's Roaming Serving MSC 106. The 800# RSU 130 is the component of the Roaming Solution network to which roaming wireless subscriber call originations will be processed through for control. The Roaming Solution Network Roaming Server 116 acts as a gateway between the NLR 112 and the Market Server 122. The Market Server 122 is the component of the account based billing network where the rating engine and the subscriber database reside.

The NLR 112 is adapted to be communicably inserted in the SS7 link between the VLR 110 of the Roaming Provider and the HLR 138 of the Home Provider. The NLR 112 is communicably linked to VLR 110 by SS7 link 108 and is communicably linked to HLR 138 by SS7 link 140. The NLR is adapted to perform the function of an HLR (subscriber profile information processing) and the function of a VLR (registered visitor roaming processing). Therefore, the NLR is adapted to look like an HLR with respect to the VLR and look like a VLR with respect to the HLR. The NLR is communicably adapted to intercept messages from the HLR and the VLR. The network NLR 112 tracks the location information for the wireless roaming subscriber and mirrors the HLR providing the wireless roaming subscriber profile information.

When the wireless mobile station or wireless mobile phone 104 of a wireless roaming subscriber enters the roaming MSCs 106 area a Regnot occurs. During the Regnot process the NLR 110 software is utilized to provide the DN and the Regnot response message to the roaming serving MSC 106. The DN is assigned to a centralized 800# RSU 130 to which all-call originations will be processed through for control. Once the mobile station 104 of the wireless roaming subscriber has completed the Regnot process the NLR software can prevent all-call terminations to the wireless roaming subscriber by setting a termination restriction code and the NLR sends a Regnot response message to the roaming serving MSC 106. At this point all-call originations from the wireless roaming subscriber can be supported.

Also, please note that during the Regnot process the NLR software captures the roaming serving MSCID and provides the MSCID to the Roaming Server 116 for use in subsequent rating of call originations. During call origination from the wireless roaming subscriber the NLR software captures the calling subscribers MIN and the dialed digits (i.e., called party number). The MIN and the dialed digits are provided to the Roaming Server for subsequent use by the centralized 800# RSU 130 in the setting up of the call to the called party. Responsive to call origination, the NLR software receives a unique DN for use by the roaming serving MSC 106 to extend the originating call to the 800# RSU.

The network architecture is also adapted to support call delivery or call termination to the wireless roaming subscriber. When the wireless roaming subscriber enters the area of the roaming serving MSC 106 the Roaming Server 116 is made aware of the wireless roaming subscriber's location. Therefore, when an incoming call to a wireless roaming subscriber arrives at the home MSC 118 the home MSC routes the call to the local account billing system RSU 120. The local account billing system RSU then queries the account billing system Market Server 122 which in turn requests a TLDN from the Roaming Server 116. The Roaming Server 116 forwards the request for a TLDN to the NLR 112. Subsequently, upon request from the Roaming Server the NLR software will obtain a TLDN from the roaming serving MSC 106 using a ROUTEREQ message and response. Once the TLDN is provided, the local RSU 120 interacting with the Roaming Server 116 utilizes this TLDN to originate a call to the roaming serving MSC 106 for the wireless roaming subscriber. When the wireless roaming subscriber answers the call, the call segments from the calling party to the local RSU 120 and from the local RSU to the called wireless subscriber will be bridged to the local RSU.

As noted above the NLR software is adapted to be capable of disabling call termination to a wireless roaming subscriber during the Regnot process. However, when a call to the wireless roaming subscriber is received at the home MSC, the NLR software is adapted to send a message to the roaming serving MSC 106 to enable call termination to the wireless roaming subscriber. Upon call disconnect the Roaming Server 116 can inform the NLR software which then can disable call terminations to the wireless roaming subscriber.

It should be noted that the wireless roaming subscriber for this network is identified by its mobile identification number (MIN). The wireless roaming subscriber MIN is captured during the Regnot process at which time the NLR software can look up within the internal subscriber lookup table to see if the roaming serving MSC supports call origination by utilizing an origination trigger. If the roaming serving MSCID is not found in the lookup table, the NLR software can load the origination trigger solely based on a transmission capability (TransCap) parameter found in the Regnot message. It is further noted that the NLR does not take into account when a wireless roaming subscriber has been handed off from its home MSC to a serving MSC (non-roaming to roaming) or from the roaming serving MSC to its home MSC (roaming to non-roaming) during a single call instance. The wireless roaming subscriber location is established at the time of Regnot. There is no additional action taken by the NLR to account for the roaming handoff that may result in a change to a wireless roaming subscriber's location when traveling between home MSC areas and roaming serving MSC areas during a single call instance. The handoffs are transparent to the software such that the roaming location of the wireless roaming subscriber is seamless and is only established at the time of Regnot.

All messages coming from the roaming serving MSC 106 can be routed to the NLR 112 via an SS7 network link 108. The NLR 112 can extract the wireless roaming subscriber's location information (i.e., MSCID, location area ID and etc.) and store it in the internal database. In addition the NLR may also change some of the profile parameters in the Regnot return result message to enable the wireless roaming subscriber to make and receive calls from and to the roaming serving MSC. The NLR can also pass the wireless roaming subscriber location information to the Roaming Server 116 via a TCP/IP network link 114.

The advantages of this Roaming Solution Network System are clear. The integration of the novel system into a standard SS7 or other standard similarly configured telecommunication network is transparent. The Home MSC and related HLR and the serving MSC and related VLR are undisturbed and will operate normally. The call monitor and control account billing system, including the Market Server 122 and local account billing system RSU 120 are undisturbed and will operate as usual. Incoming calls to the Home Provider's switch can be delivered to the previously unregistered but now registered credit limited roaming subscribers. Calls can be originated by these same now registered credit limited roaming subscribers without the need for roaming platforms supporting each roaming providers site. This is all provided while mitigating the risk of exposure to credit risk for the Home Provider.

Figure 2:
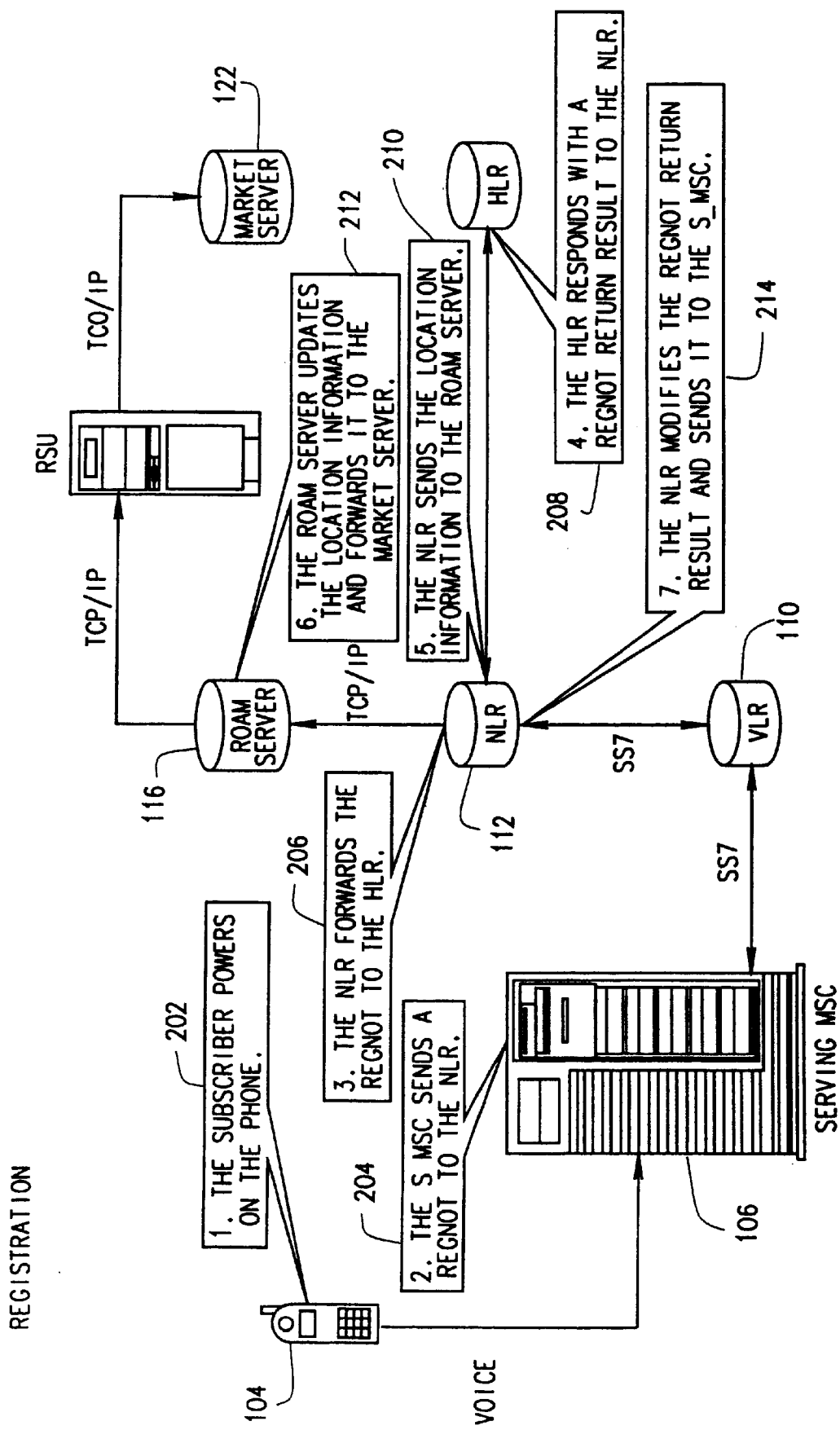
FIG. 2 is a call flow diagram of the Regnot process.

Referring to FIG. 2, a call flow diagram for a call Regnot process when the wireless roaming subscriber powers on the mobile phone while in the roaming serving MSC's area or when the wireless roaming subscriber transitions to the roaming area. When the wireless roaming subscriber powers on 202, the mobile phone 104, the mobile phone transmits a MIN to the roaming serving MSC 106 which sends a Regnot message 204 via an SS7 network link to a VLR 110. The VLR for the roaming serving MSC is configured to identify the NLR point code as the HLR for the pre-reserved block of wireless roaming subscriber MINs. Therefore the roaming serving MSC sends the Regnot to the NLR. Upon receiving the Regnot message the NLR can look up the MIN in the internal database of the NLR to see if the wireless roaming subscriber is listed. If the wireless roaming subscriber is listed, the NLR can replace the roaming serving MSCID with the NLR MSCID and forward the Regnot message 206 to the HLR using the direct point code of the HLR. If the wireless roaming subscriber is not listed then the NLR can pass through the message directly to the HLR without any modifications (i.e., the MSCID is not replaced with the NLR ID). The HLR can then respond with a Regnot return result message 208 to the NLR via the SS7 network link. The NLR can modify the Regnot return result message before forwarding it to the roaming serving MSC. The NLR can replace the HLR MSCID with the NLR MSCID. The NLR can set the origination indicator to 8 for all-call originations at the roaming serving MSC. The NLR can also set the digits for destination equal to the 1-800 DN identification services (DNIS) number. Also the NLR can set the termination restriction code to 1 to restrict termination at the roaming serving MSC. The setting of the origination indicator to 8 indicates that all-call originations should be routed to a single NPA-NXX-XXXX. The hot line number (1-800 DNIS number) is configurable for each pre-reserved block of wireless roaming subscriber MINs. The hot line number can be utilized to route the call originations to the centralized 800# RSU. If the termination restriction code is set to 1, or other appropriate code number, (termination denied), no incoming call will be delivered to the wireless roaming subscriber.

The NLR can then send the location information for the wireless roaming subscriber 210 to the Roaming Server 116 over the TCP/IP link. The Roaming Server can then update the location information for the wireless roaming subscriber and in turn forwards the location information for the subscriber 212 to the Market Server 122. The Roaming Server then confirms the location message to the NLR. Again please note that the NLR can modify the Regnot return result message before forwarding it back 214 to the roaming serving MSC. The NLR can replace the HLR MSCID with the NLR MSCID. The NLR can also set the origination trigger's field to all-call attempts which will invoke an origination request message to the NLR when the wireless roaming subscriber makes a call. The NLR can also set the termination restriction code to 1, or other appropriate code number, to deny all termination such that no incoming calls will be delivered to the wireless roaming subscriber.

Figure 3:
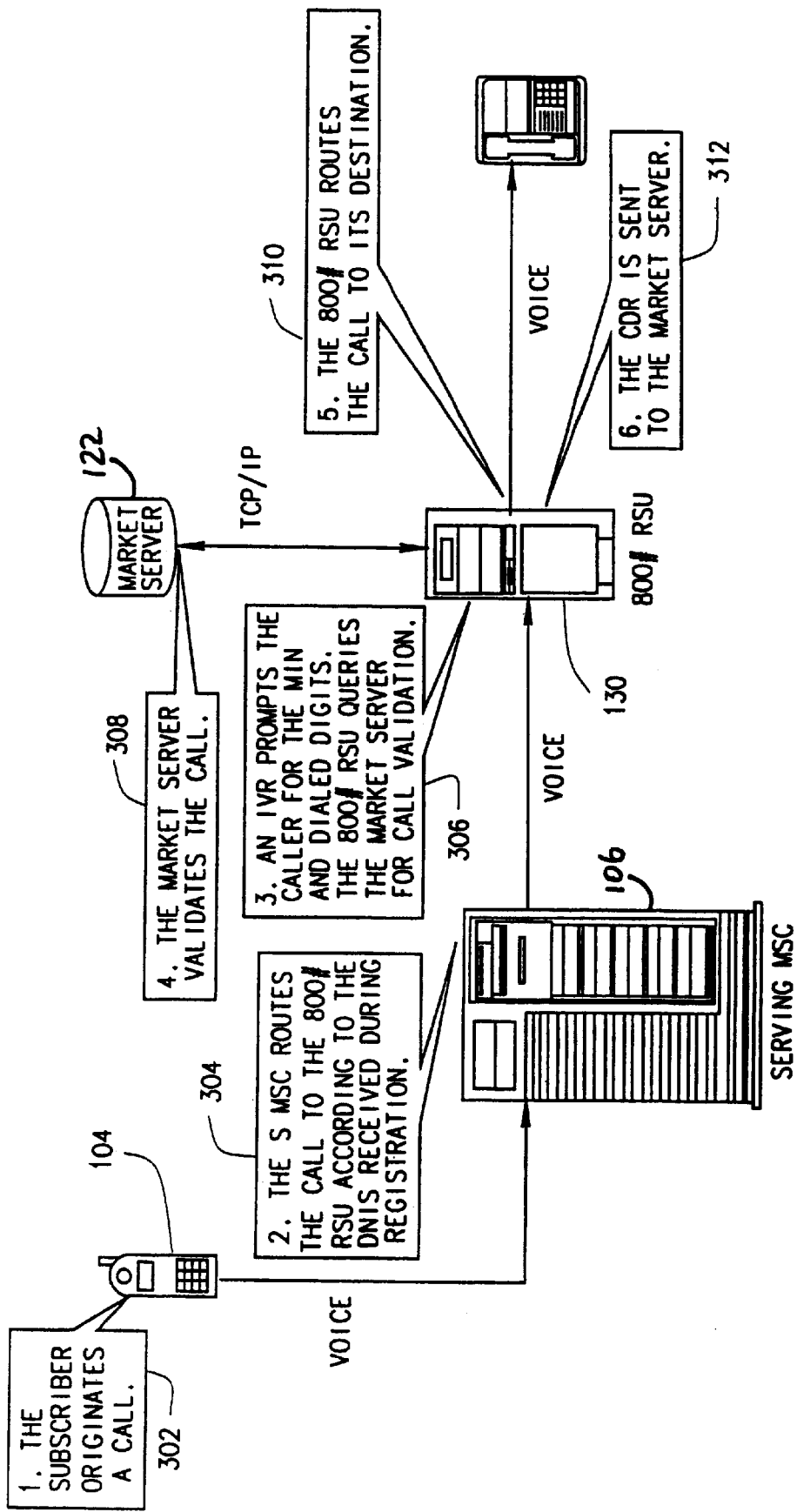
FIG. 3 is a call flow diagram of call origination by a wireless Roaming Provider (2-stage dialing)

Once the Regnot process is performed in accordance with the call flow diagram of FIG. 2, call origination from a wireless roaming subscriber can be attempted. Referring to FIG. 3 which shows the call flow diagram for call origination by the wireless roaming subscriber. FIG. 3 is representative of call origination in a telecommunication network where only 2-stage dialing is supported. This is due to the version of the SS7 network or like network where origination request messages are not fully supported. The wireless roaming subscriber originates a call 302 by entering a party's number and sending the requested number from the mobile station 104. This attempted call origination by the wireless roaming subscriber is routed to the roaming serving MSC 106 and the roaming serving MSC routes the call attempt 304 to the centralized 800# RSU (call origination RSU) 130 by out dialing the 1-800 DNIS number (hot line number) received during registration. Once the 800# RSU receives the call attempt it can collect the requested party's DN and the MIN 306 from the wireless roaming subscriber (can be obtained by second stage dialing) and query 306 the Market Server 122 for call validation. If call validation is positive 308 the Market Server forwards this maximum call duration to the centralized 800# RSU 130. The centralized 800# RSU then connects the call 310 to the requested party's destination DN. The centralized 800# # RSU can monitor the call to indicate the call has been connected and begins the timing of the call from the time the call was first routed to the 800# RSU. The call can be torn down and disconnected when the call either disconnects at the originating MSC or terminating instrument or when the maximum call duration has been reached.

The call record is communicated to 312 the Market Server. The advantages of utilizing the Market Server 122 in combination with the 800# RSU 130 as described above is that the call can be monitored and controlled by a central 800# RSU for real-time account billing without need for roaming platforms local to the Roaming Provider's Serving MSC.

Figure 4:
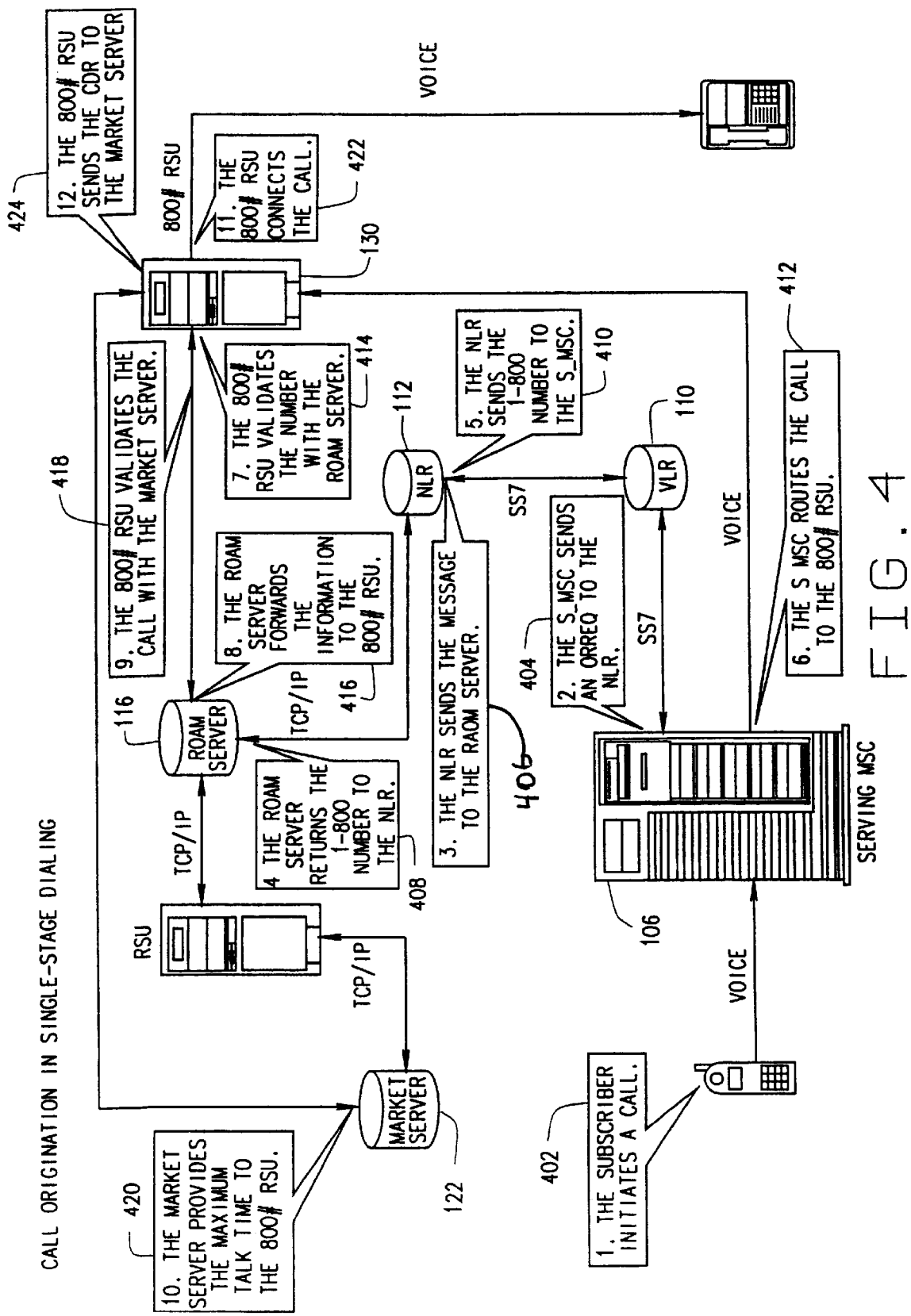
FIG. 4 is a call flow diagram of a call origination from a wireless Roaming Provider (single stage dialing)

Referring to FIG. 4, a call flow diagram is shown for call origination after Regnot has occurred in accordance with the call flow diagram shown in FIG. 2. Call origination after call registration in accordance with a call flow diagram of FIG. 2 does not require second stage dialing for systems that fully support the origination request message. The wireless roaming subscriber originates a call 402 to the roaming serving MSC 106 and the roaming serving MSC sends an origination request message 404 to the NLR 112 via the VLR 110. The NLR sends a message 406 which contains the requested party's digits and the wireless roaming subscriber MIN to the Roaming Server 116 over the TCP/IP network link. This information is in turn stored in the Roaming Server. A new unique 1-800 DNIS number can be assigned by the Roaming Server for this call originated by the wireless roaming subscriber. The Roaming Server then returns the 1-800 number 408 to the NLR. The NLR forwards the 1-800 DNIS 410 to the roaming serving MSC in the origination request return result message. The roaming serving MSC can route the call 412 to the 800# RSU 130 via the 1-800 DNIS. The 1-800# RSU queries 414 the Roaming Server to validate the 1-800 DNIS number received. The Roaming Server then looks up the 1-800 DNIS in the internal database to get the requested party's dialed digits and the roaming subscriber's MIN and forwards the request 416 to the 800# RSU to validate the call. The 800# RSU validates the call 418 with the Market Server 122. If the validation is positive the Market Server provides the maximum call duration to the 800# RSU. The 800# RSU then connects the call 422 to the requested party's destination dialed digits. The 800# RSU can then monitor the call to indicate that the call has been connected and will begin timing the call from the time that the call was first routed to the 800# RSU. The call can be torn down and disconnected when the call either disconnects at the originating MSC or terminating instrument or the maximum call duration has been reached. The call record is forwarded 424 to the Market Server.

The advantages of utilizing the NLR 112 and the Roaming Server 116 to capture and channel information and to validate and route the call to the 800# RSU are that single-stage dialing is accomplished.

Figure 5:
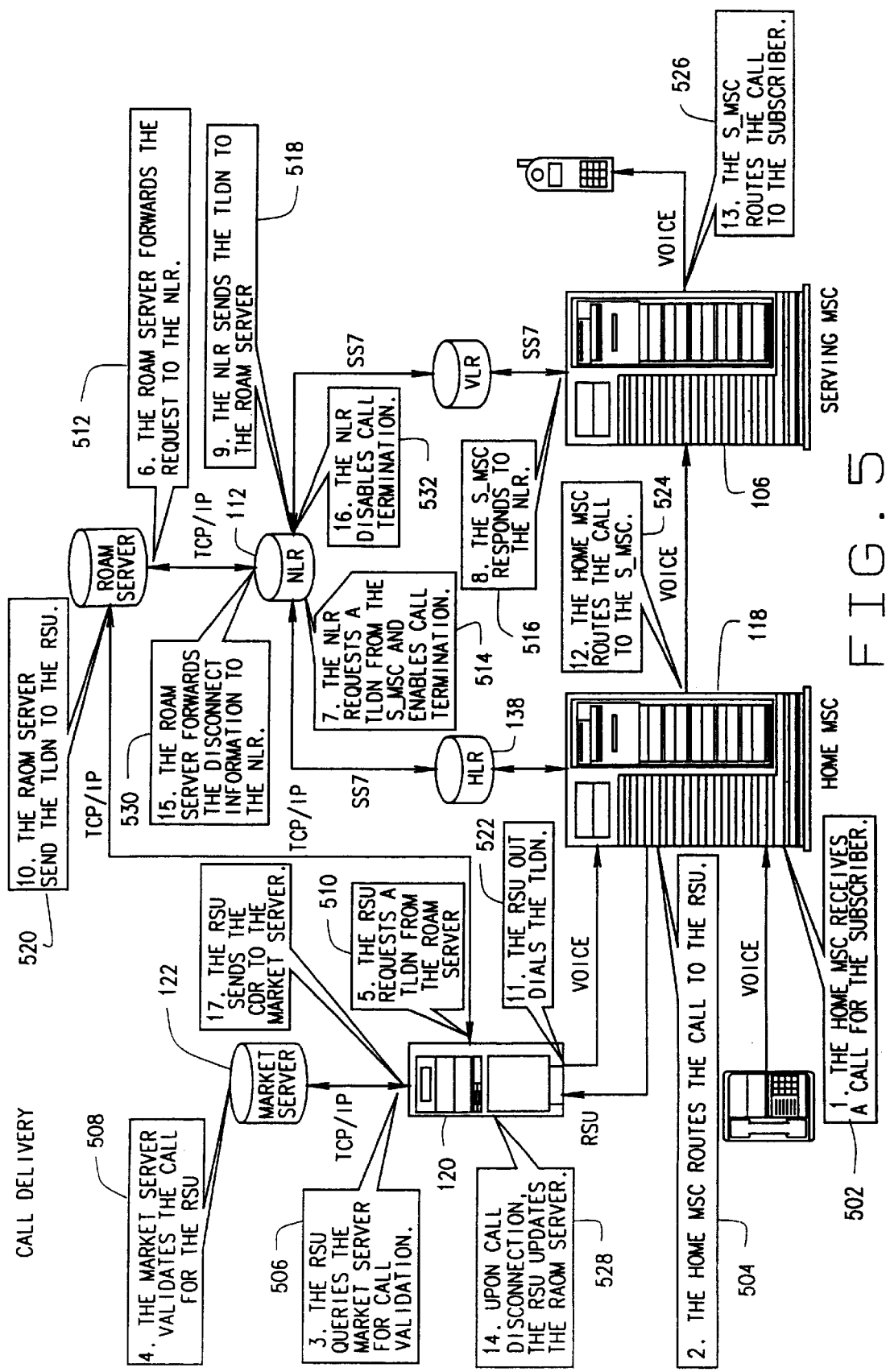
FIG. 5 is a call flow diagram of call delivery at the roaming serving MSC to the roaming subscriber.

Referring to FIG. 5, a call flow diagram is shown for call termination or call delivery at a roaming serving MSC 106 for incoming calls 502 to a wireless roaming subscriber. The call flow is initialized by the home MSC 118 of the roaming subscriber receiving an incoming call intended for the roaming subscriber. The home MSC 118 sends a location request message to the HLR 138 in an attempt to locate the wireless roaming subscriber and the roaming serving MSC 106 for which the subscriber is being served. The HLR returns the DN in the location request return result message. The home MSC 118 routes the call 504 to the local account billing system RSU 120 via the DN. The local RSU then queries 506 the Market Server 122 for call validation 508 and requests a TLDN 510 from the Roaming Server. The Roaming Server forwards the request for a TLDN 512 to the NLR 112. The NLR then sends a qualification directive (QUALDIR) message to the roaming serving MSC 106 to enable call delivery 514. The NLR then sends a route request message to the roaming serving MSC (VLR) via the SS7 network link requesting a TLDN 514. The roaming serving MSC then responds with a ROUTEREQ return result message containing the TLDN 516 to the NLR. The NLR then returns the TLDN 518 to the Roaming Server, which in turns forwards the TLDN 520 to the local RSU 120. The Market Server has already provided the maximum call duration to the local RSU. The local RSU then out dials the TLDN 522, which in turn routes the incoming call 524 to the roaming serving MSC 106. The roaming serving MSC then terminates and completes the call 526 to the roaming subscriber. The RSU 120 monitors the call to indicate that the call has been connected and begins timing the call from the time the call was first routed to the RSU. The call can be torn down and disconnected when the incoming call is either disconnected at the originating or terminating instrument or the maximum call duration has been reached. Upon call disconnection, the RSU updates 528 the Roaming Server which in turn forwards disconnect information 530 to the NLR. The NLR disables 532 call termination.

The advantage is that during Regnot the NLR was identified by the VLR as the HLR, thus the roaming serving MSC registered with the NLR as if it were the HLR. The NLR is able to identify the actual HLR based on looking up the MIN of the roamer. The NLR can then contact the actual HLR and will identify itself (the NLR) as the VLR serving the roamer by providing the actual HLR with NLR MSCID in lieu of the roaming serving MSCID. Therefore, the HLR sees the NLR as the VLR serving the roamer. The NLR also during Regnot contacts the Roaming Server and the Market Server to identify the location of the roamer. The NLR is now the focal point with respect to handling roamer communication. This makes for seamless roaming as the roaming subscriber transitions from one MSC to the next.

Figure 6:
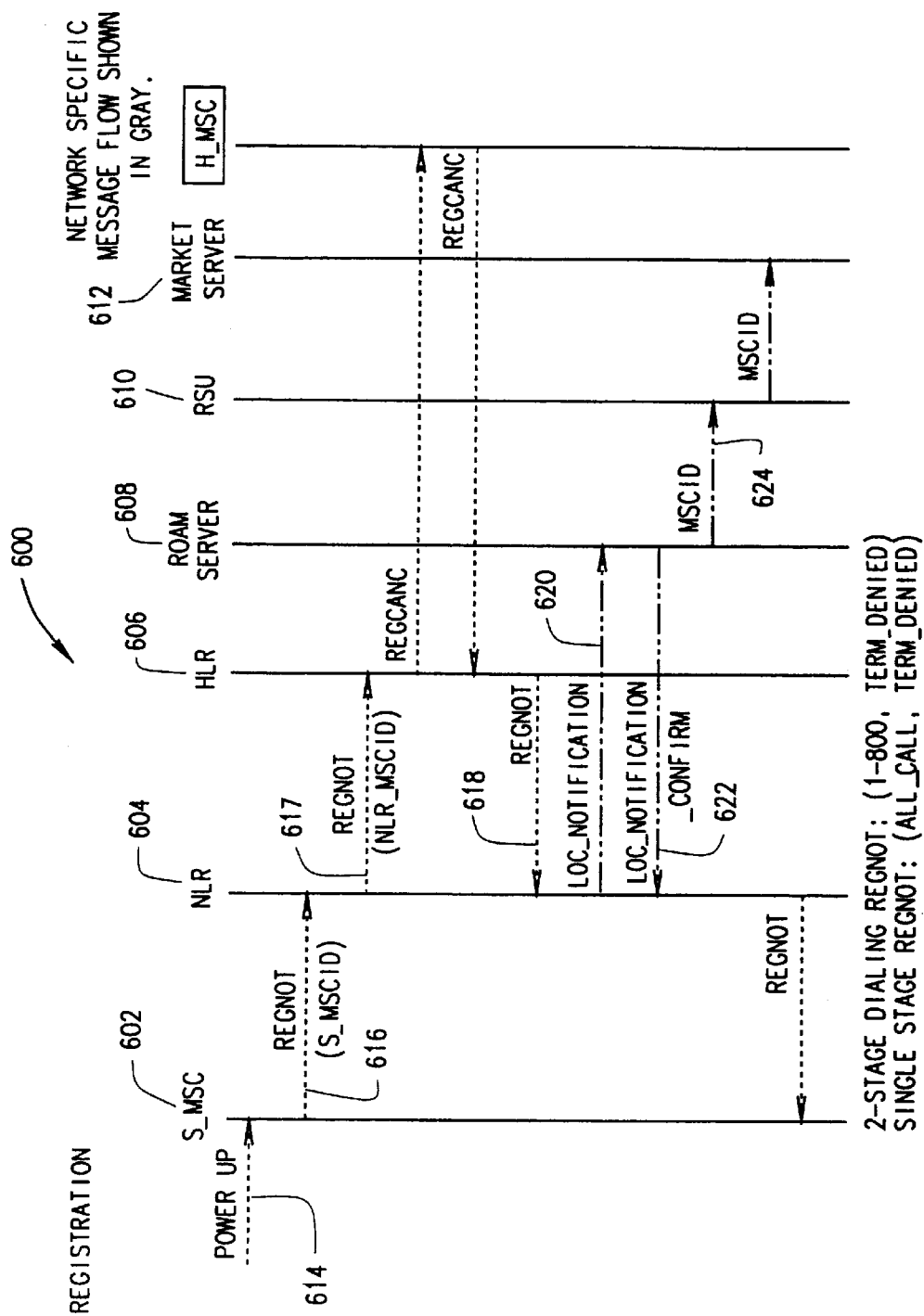
FIG. 6 is an interface messaging sequence between a roaming serving MSC, a NLR, and a HLR for roaming subscriber Regnot at power up.

Referring to FIG. 6, the interface message sequence 600 roaming registration is shown. It should be first noted prior to discussing the interface message sequence as outlined in FIG. 6 that all messages from wireless roaming subscribers that are not listed in the NLR database are passed directly to the HLR without any modifications to the Regnot message. The situation of the non-listed subscriber is not what is reflected by the interface message sequence of FIG. 6. FIG. 6 reflects an interface message sequence where the wireless roaming subscriber is listed in the NLR.

The first interface message in the sequence occurs when the wireless roaming subscriber powers on the phone 614 at which time the mobile station of the subscriber provides the MIN of the subscriber to the serving MSC 602. The serving MSC 602 sends a Regnot message 616 via the SS7 network to the NLR which includes the MIN of the subscriber and the roaming serving MSCID. Upon receiving the Regnot message, the NLR looks up the MIN in the internal database to see if the subscriber is a listed subscriber. For the listed wireless subscriber, the NLR will replace the serving MSCID and point code with the NLR MSCID and point code and forward the Regnot message 617 to the HLR 606. Please note, that if the subscriber is not a listed wireless subscriber, the NLR will pass through the message directly to the HLR without any modifications. The HLR will then respond with a Regnot return result message 618 to the NLR. The NLR will then send the location information to the NTC Roaming Server 608 over a TCP/IP interface in a location notification message 620. The Roaming Server 608 will then return a location notification confirmation message 622 to the NLR 604. The Roaming Server 608 updates the location information and forwards the location information to the Market Server by transmitting the MSCID 624 to the RSU 610 which in turn transmits the MSCID to the Market Server 612. In networks where 2-stage dialing is required, the NLR will modify the Regnot return result message in the following ways before forwarding it to the serving MSC. First, the NLR will replace the HLR MSCID with the NLR MSCID. Second, the NLR will set the origination indicator to an all call origination indication. Third, the NLR will set the destination digits equal to the 1-800 DNIS number. Fourth, the NLR will set the termination restriction code to an indication of termination denied. In single-stage dialing, the NLR will modify the Regnot return result message as follows before forwarding it to the serving MSC. Again, the HLR MSCID is replaced with the NLR MSCID. The NLR will set the origination triggers field to all call attempts. The NLR will further set the termination restriction code to an indication that termination is denied. Please note that setting the origination triggers to all call will invoke an origination request message to the NLR when the wireless roaming subscriber makes a call. The NLR shall maintain an internal provisionable table to identify MSCs that can support origination triggers.

Figure 7:
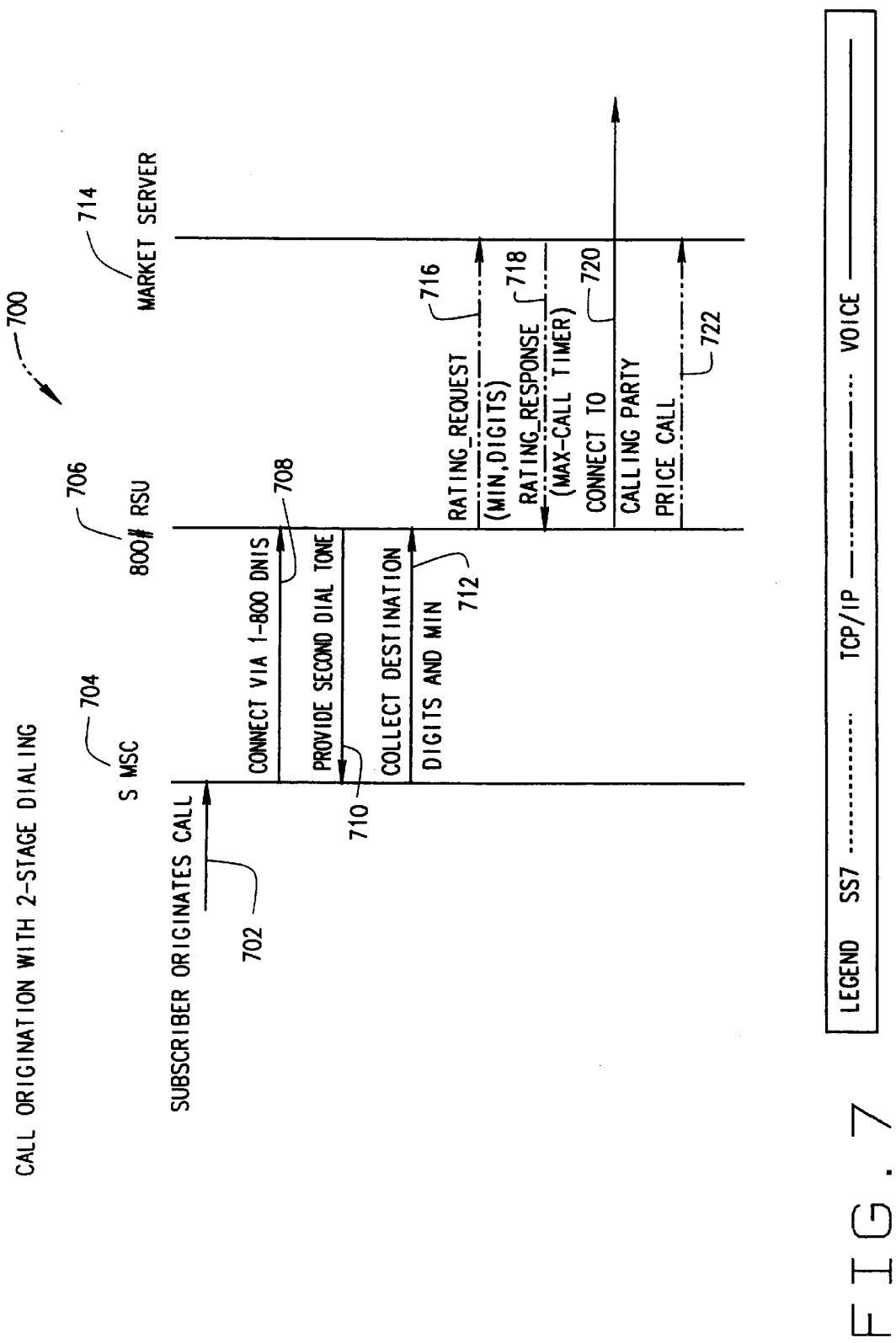
FIG. 7 is an interface messaging sequence between a roaming serving MSC, an 800# RSU, and a Market Server for roaming call origination which includes a second dial tone from the 800# RSU.

Once the interface method sequence of FIG. 6 is performed for roaming Regnot, roaming call origination from the wireless roaming subscriber can be provided. Referring to FIG. 7, the interface message sequence for roaming call origination 700 requiring 2-stage dialing is shown for calls originated after the Regnot sequence of FIG. 6 is performed. The interface messaging sequence begins when the wireless roaming subscriber originates a call 702 at the roaming serving MSC 704. The roaming serving MSC will process the roaming call origination through the centralized 800# RSU 706 via the 1-800 DNIS 708 that was inserted during the Regnot process as shown in FIG. 6. The centralized 800# RSU (call origination RSU) 706 will provide a second dial tone 710 in order to collect the destination digits 712 for making the call connection to the called party. The 800# RSU will then query the Market Server 714 with a rating request message 716 for call validation. The rating request message will provide the MIN of the wireless roaming subscriber and the digits of the destination number. If the Market Server finds that the call validation is positive, the Market Server will send a rating request response message 718 back to the 800# RSU which contains the maximum call duration. Then the centralized 800# RSU connects the call 720 to the destination DN of the party being called. The 800# RSU will monitor the call for pricing 722.

Please note the connection between the NLR and the Roaming Server must be monitored to assure that an active connection is maintained. Therefore, there is an interface protocol between the Roaming Server and the NLR over a TCP/IP network link that is designed to monitor the active connection between the Roaming Server and the NLR. The interface monitoring interface protocol is initiated by a NLR. The NLR opens the TCP/IP network link by sending an active connection status check to the Roaming Server. The NLR shall be responsible for sending the active connection status check message at a determined interval. In the NLR active connection status check message the NLR shall report the status of the SS7 link, the database and application to the Roaming Server. The Roaming Server shall be adapted to respond to the active connection status check message with a reply message indicating an active connection. The Roaming Server shall reply back with a reply message within a fixed interval. If the NLR does not see the reply message from the Roaming Server within that fixed interval, the NLR shall close the active connection and shall attempt to reconnect to the Roaming Server. If the reconnection attempt fails, the NLR shall retry at fixed intervals. The reply time interval and the retry time interval are configurable parameters set by the NLR.

Figure 8:
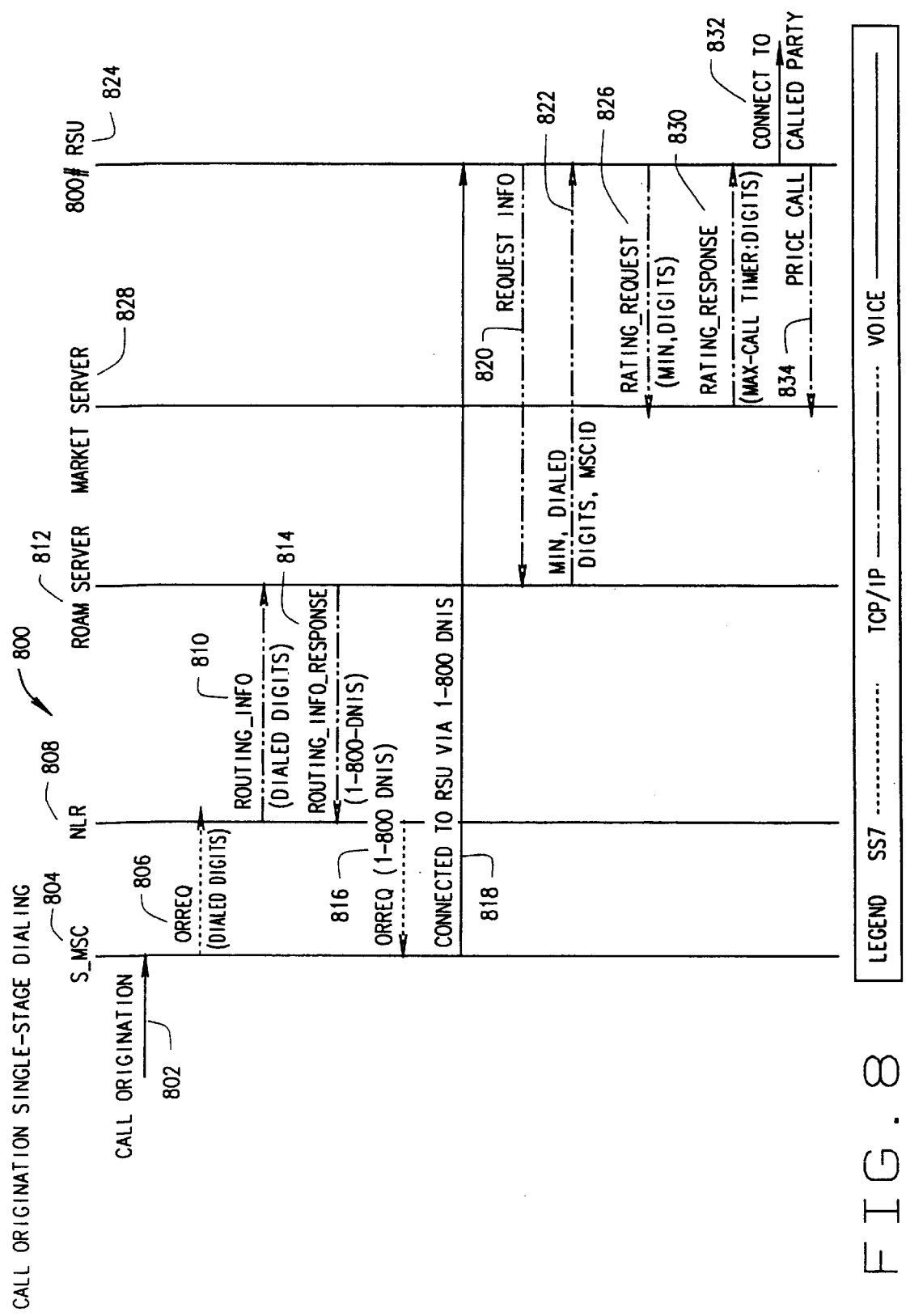
FIG. 8 is an interface messaging sequence between a roaming serving MSC, a LLR, a Roaming Server, a Market Server, and an 800# RSU for wireless roaming call origination single-stage dialing.

Referring to FIG. 8 the interface messaging sequence is shown for wireless roaming call origination 800 network environment. For roaming call origination to occur, the VLR for this wireless roaming subscriber is set to all-call for the origination trigger during the Regnot procedure. Call origination occurs when the wireless roaming subscriber dials the digits of the desired party and sends the call origination message 802 with the dialed digits to the roaming serving MSC 804. The roaming serving MSC then transmits an origination request message 806 to the NLR 808 which includes the dialed digits of the party being called. The NLR then shall send the routing information message 810 along with the dialed digits of the party being called to the Roaming Server 812. The Roaming Server shall then assign a temporary 1-800 DNIS for the wireless roaming subscriber and shall store the 1-800 DNIS together with the dialed digits of the party being called as received in the origination request message. The Roaming Server shall then respond to the NLR with the routing information response message 814 which contains the 1-800 DNIS along with the dialed digits of the desired call. The NLR shall then respond to the roaming serving MSC 804 with an origination request return result message 816 that includes the 1-800 DNIS as the destination digits. The roaming serving MSC 804 is then connected 818 to an 800# RSU (call origination RSU) 824 via the 1-800 DNIS as assigned by the Roaming Server. If the NLR does not receive the routing information response message 820 from the Roaming Server within a defined time interval, the NLR shall retry the routing information message again and shall put the 1-800 DNIS in the routing digits of the origination request return result. The Roaming Server transmits the MIN, dialed digits and MSCID 822 to the 800# RSU 824. The 800# RSU 824 sends a rating request message 826 from the 800# RSU to the Market Server 828 which includes the MIN of the wireless roaming subscriber and the dialed digits. The Market Server performs a call validation, and if the call validation is positive, the Market Server will respond back with a rating request response 830, including the maximum call duration, as well as the dialed digits of the party being called. The 800# RSU then connects 832 the calling party to the party being called. The 800# RSU monitors the call for pricing 834, and transmits to the Market Server.

Figure 9:
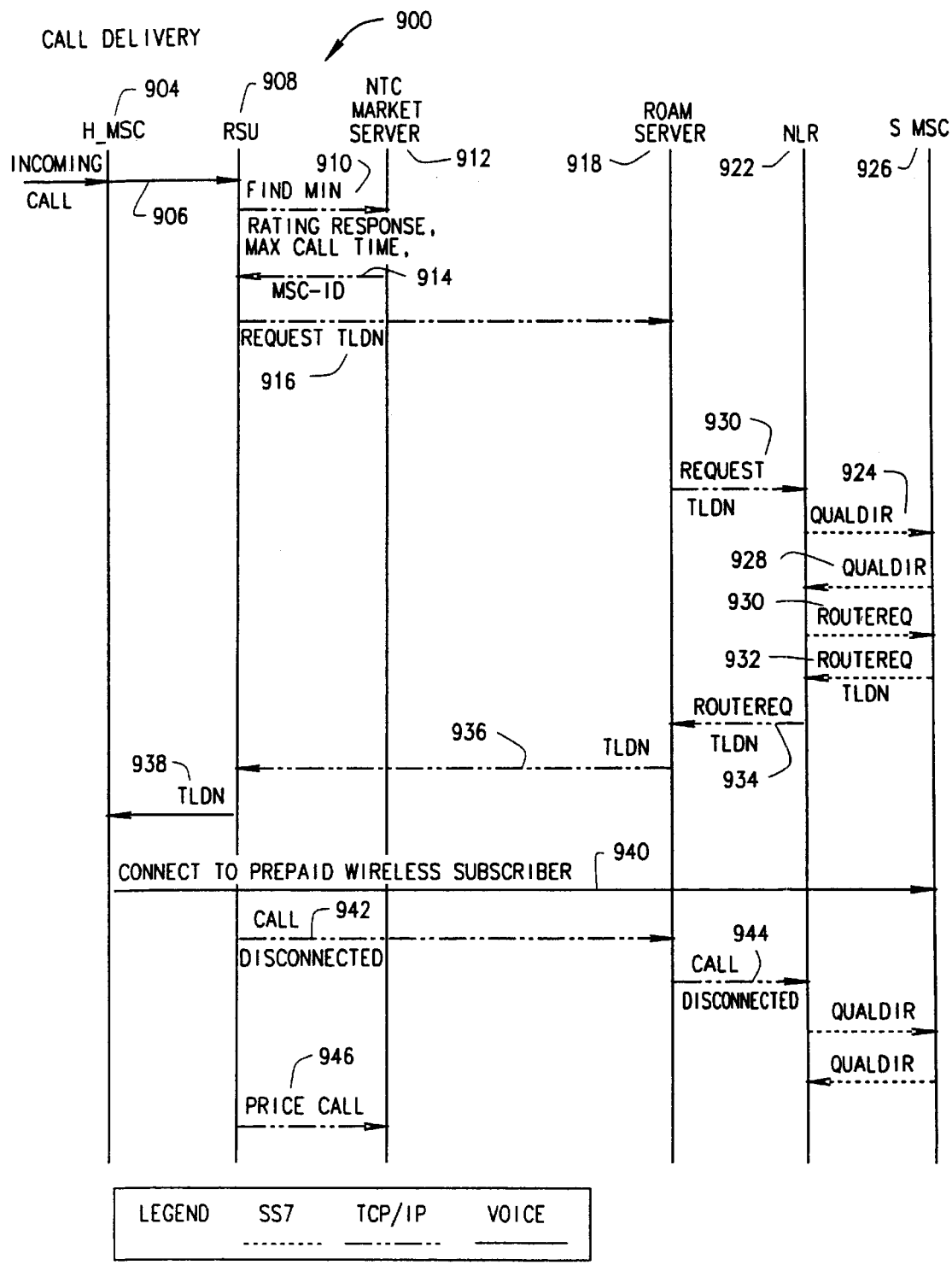
FIG. 9 is an interface messaging sequence between a home MSC, a HLR, a LLR, a local RSU, a Market Server, a Roaming Server, and a roaming serving MSC for call delivery to the roaming serving MSC for the wireless roaming subscriber.

Referring to FIG. 9, an interface messaging sequence is shown for delivery of an incoming call at the home MSC to the wireless roaming subscriber at the roaming serving MSC. The call delivery interface messaging sequence 900 is initiated by an incoming call 902 at the home MSC 904. The home MSC attempts to locate the wireless roaming subscriber. The HLR responds back to the home MSC with a location request response message providing connection information to a local RSU. The home MSC then connects 906 to the local account billing system RSU 908 via the DN and in turn the local billing RSU sends a rating request message 910 to the Market Server 912 which includes the MIN and the digits dialed for call validation. If validation is positive, the Market Server returns the MSCID to the local RSU 908. A routing request message 916 is sent to the Roaming Server 918 requesting TLDN, which in turn requests the TLDN 920 from the NLR with a routing request message. The NLR 922 shall send a QUALDIR message 924 to the roaming serving MSC 926 to enable call termination for the wireless roaming subscriber. A QUALDIR return message 928 is transmitted back from the roaming serving MSC to the NLR. The NLR shall then obtain a TLDN from the roaming serving MSC utilizing a ROUTEREQ message 930. Upon receiving the ROUTEREQ return result message 932 from the roaming serving MSC, the NLR shall send a routing request response message 934 with the TLDN to the Roaming Server. The Roaming Server will then send a routing request response message 936 to the RSU 908, including a TLDN, which in turn is transmitted 938 to the Home MSC 904. The local RSU will then connect 940 to the wireless roaming subscriber by terminating at the roaming serving MSC thereby completing the call.

The call can be torn down and disconnected 942 by call disconnection at the home MSC or disconnection 944 at the Roaming Server. The call is priced 946 by the local billing RSU.

Figure 10:
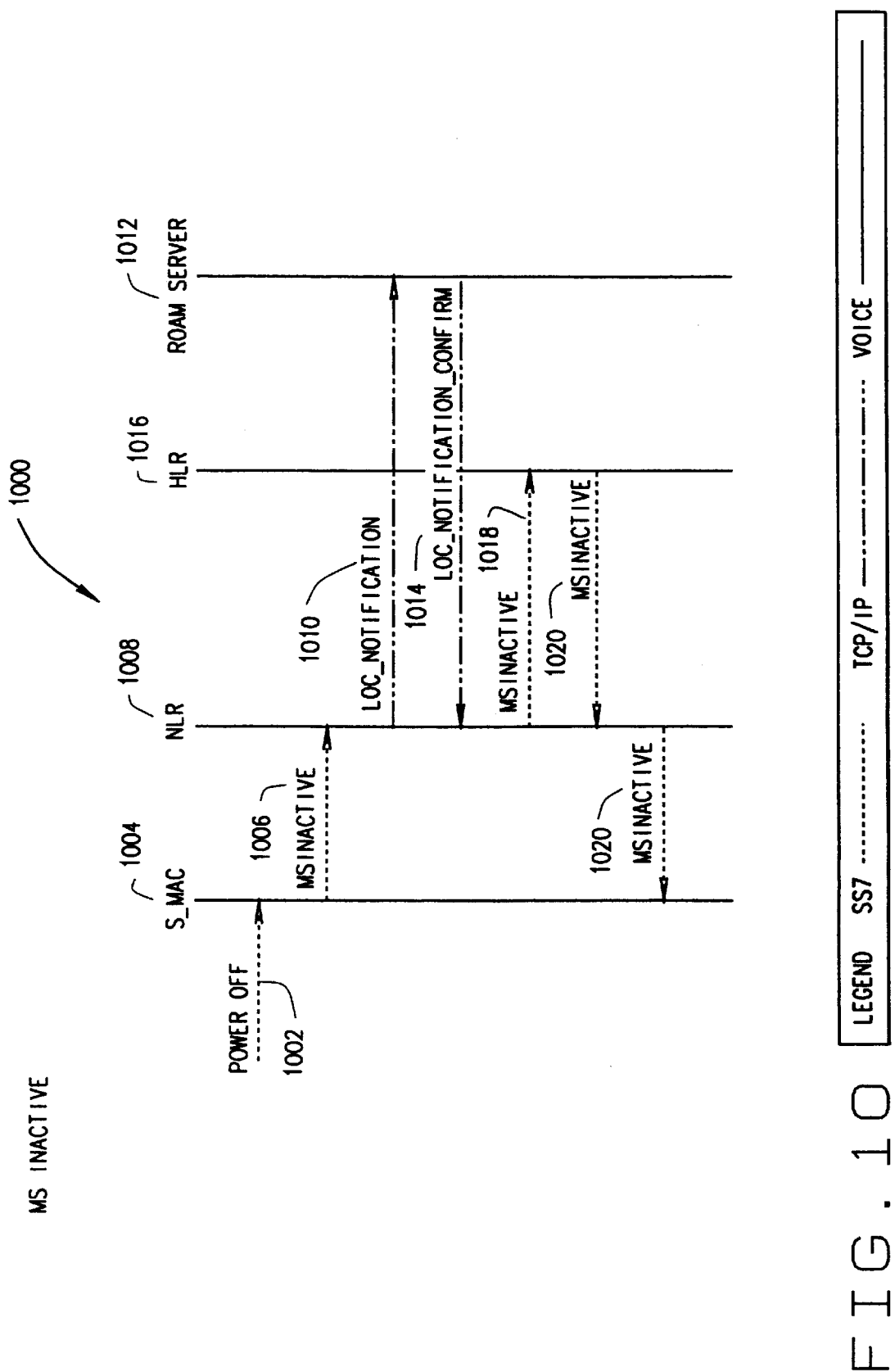
FIG. 10 is an interface messaging sequence when a mobile station goes inactive.

Referring to FIG. 10, a sequence of signals 1000 are shown that occurs when the mobile station is powered off becoming inactive. A power off signal 1002 is transmitted to the serving MSC 1004. The serving MSC sends a mobile station inactive signal 1006 to the NLR 1008. The NLR then transmits a location notification signal 1010 to the Roaming Server 1012. The Roaming Server 1012 then responds back with a location notification confirmation message 1014. The NLR 1008 then notifies the HLR 1016 with a mobile station inactive signal 1018. A mobile station inactive return signal 1020 is transmitted back from the HLR to the NLR and the NLR forwards the mobile station inactive return signal 1020 to the serving MSC.

Figure 11:
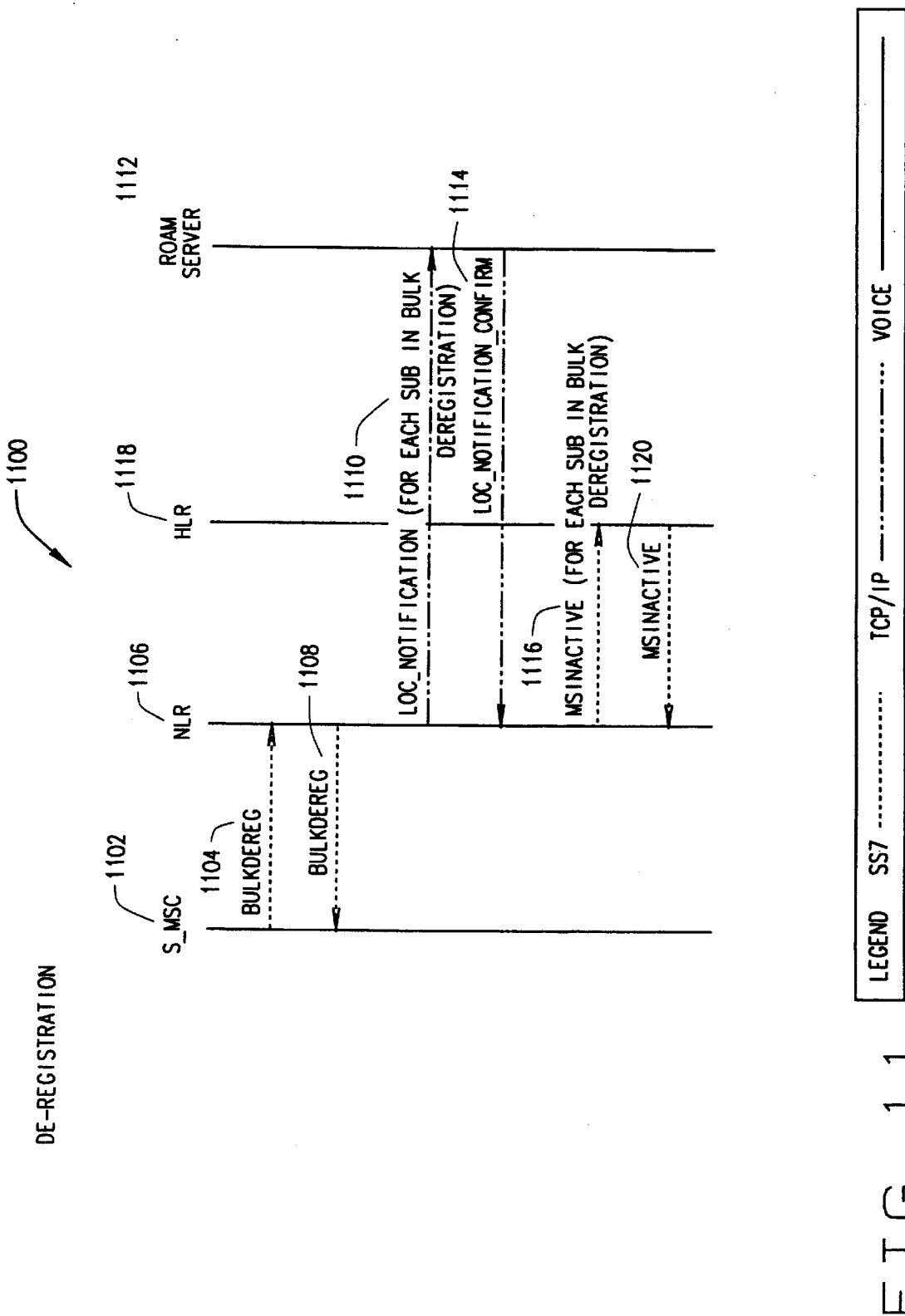
FIG. 11 is an interface messaging sequence for bulk de-registration of actively registered roaming subscribers.

Referring to FIG. 11, a sequence is shown for a bulk de-registration 1100. The bulk de-registration is initiated by the serving MSC 1102 which sends a bulk de-registration signal 1104 to the NLR 1106. The NLR responds back with a bulk de-registration return signal 1108. The NLR then sends a location notification signal 1110 for each subscriber included in the bulk de-registration to the Roaming Server 1112. The Roaming Server sends a location notification confirmation signal 1114 back to the NLR. The NLR then sends a mobile station inactive signal for each subscriber in the bulk de-registration 1116 back to the HLR 1118. The HLR then transmits a mobile station inactive return signal 1120 to the NLR.

Figure 12:
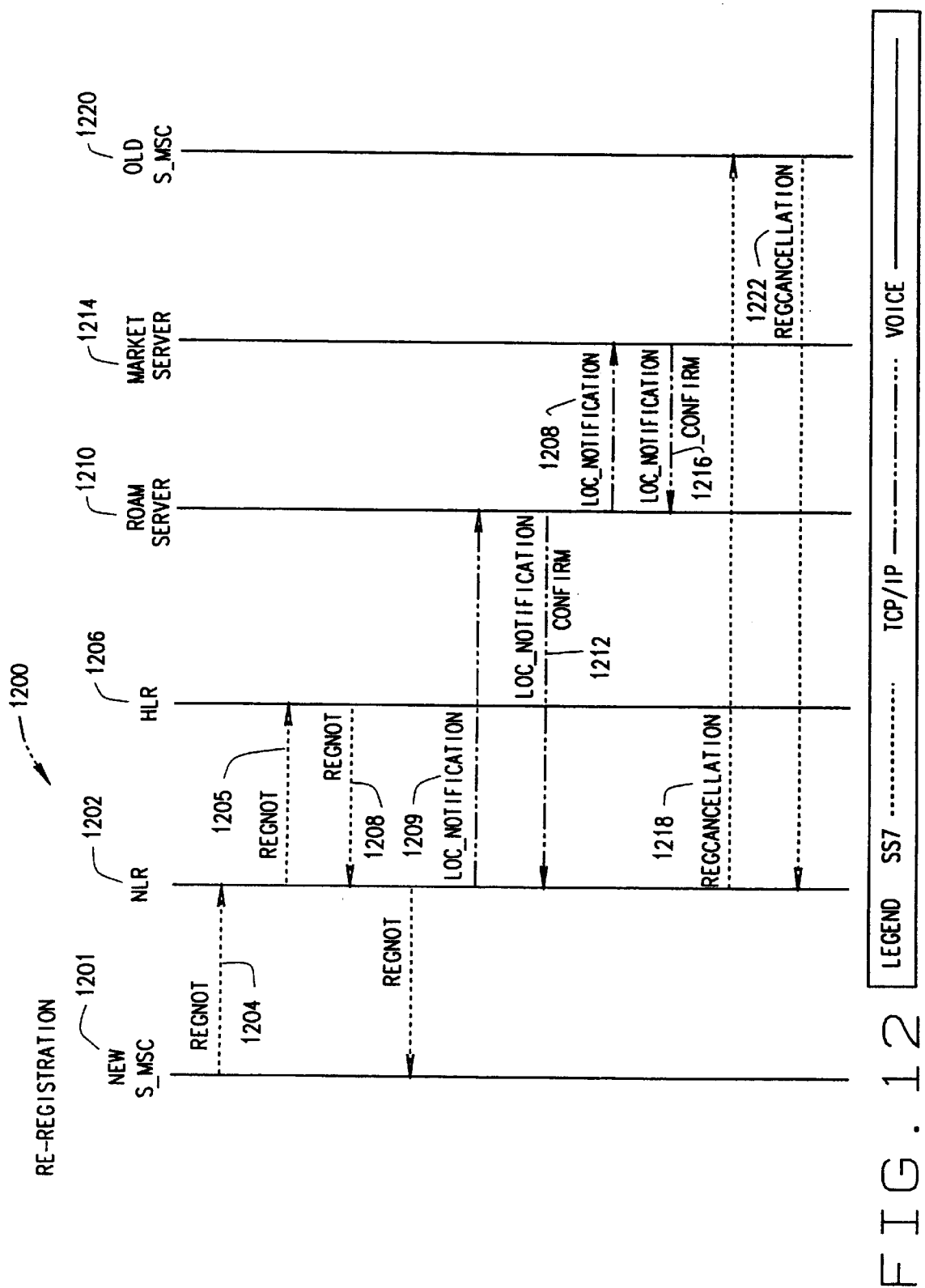
FIG. 12 is an interface messaging sequence for re-registration when a roaming subscriber enters the network of a new serving MSC.

Referring to FIG. 12, the message sequence for re-registration 1200 to a new serving MSC is shown. The sequence is initiated by the new serving MSC 1201 which transmits a registration notification 1204 to the NLR 1202. The NLR modifies the Regnot and then forwards the registration notification message 1205 to the HLR 1206. The HLR then transmits a registration notification return message 1208 to the NLR which then forwards the message back to the new serving MSC. The NLR 1202 then transmits a location notification message 1209 to the Roaming Server 1210. The Roaming Server then transmits a location notification confirmation message 1212 back to the NLR 1202. The Roaming Server 1210 also forwards the location notification message to the Market Server 1214 and the Market Server responds back with a location notification confirmation message 1216. The NLR then transmits a registration cancellation message 1218 to the old serving MSC 1220 which in turn responds back with a registration cancellation return message 1222.

Figure 13:
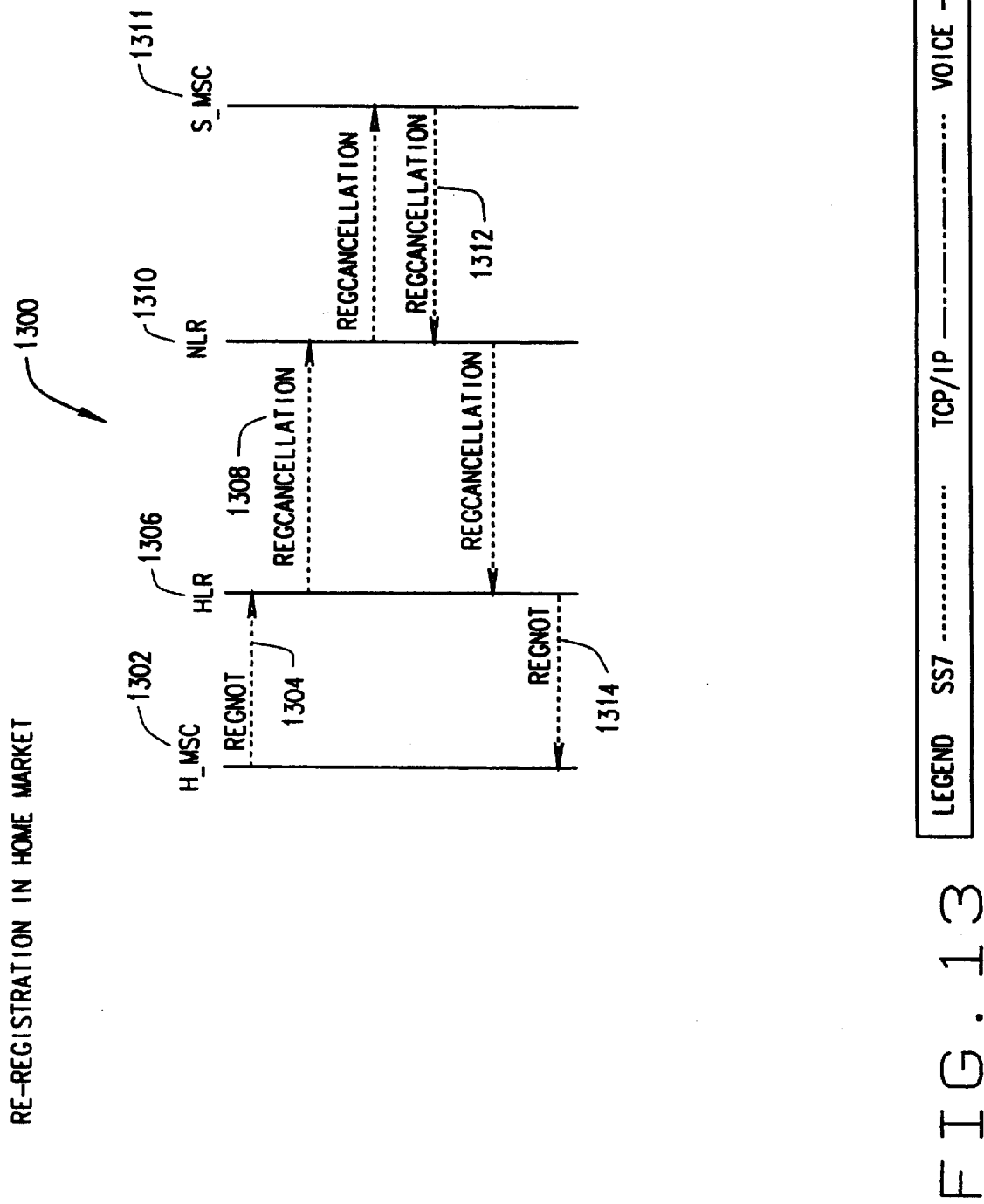
FIG. 13 is an interface messaging sequence for re-registration when the roaming subscriber re-enters the home network.

Referring to FIG. 13, the message sequence for re-registration in the home market 1300 is shown. The message sequence is initiated by the home MSC 1302 transmitting a registration notification message 1304 to the HLR 1306. The HLR then transmits a registration cancellation message 1308 to the NLR 1310. The registration cancellation message is then forwarded to the serving MSC 1311 which in turn transmits a registration cancellation return message 1312 back to the NLR. The NLR then forwards the registration cancellation return message back to the HLR 1306. The HLR then transmits a registration notification return message 1314 back to the home MSC 1302.

The various call flow examples shown above illustrate many of the novel aspects of the Roaming Solution. A user of the present invention may choose any of the above call flows, or an equivalent thereof, depending upon the desired application. In this regard, it is recognized that various forms of the subject Roaming Solution could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A wireless telecommunications network for providing telecommunications services to at least one credit limited wireless subscriber in a plurality of wireless subscribers, the network including at least one home mobile switching center, the home mobile switching center including a home location register, and the network including at least one serving mobile switching center, the serving mobile switching center including a visiting location register; and the network comprising:
   switching means for switching telecommunications calls;
   mobile station means for placing and receiving the telecommunications calls;

register means for providing a national location register, the register means coupled with the home mobile switching center, the register means further coupled with the serving mobile switching center;

wherein the register means communicates as the visiting location register with the home mobile switching center and as the home location register with the serving mobile switching center;

wherein the register means is configured to receive messages from the home mobile switching center and from the serving mobile switching center; and wherein the register means is further configured to transmit roaming information regarding the messages to a roaming server, wherein the roaming server is configured to perform real-time call control and credit limited account based billing, based on the roaming information.

2. The network of claim 1, wherein the register means further comprises:

message processing means for receiving at least one registration notification message from the serving mobile switching center and to modify the registration notification message to identify the register means as the visiting location register with respect to the home mobile switching center and as the home location register with respect to the serving mobile switching center.

3. The network of claim 1, wherein the register means further comprises:

message processing means for transmitting a termination restriction message to the serving mobile switching center, whereby call termination is restricted at the serving mobile switching center.

4. The network of claim 1, wherein the register means further comprises:

number selector means for assigning a telephone number unique to a roaming call for routing call originations through a call origination Remote Service Unit.

5. The network of claim 1, wherein the register means is configured to request a Temporary Location Directory Number from the serving mobile switching center, whereby incoming calls are routed from the home mobile switching center to the serving mobile switching center.

6. A wireless telecommunications network for providing telecommunications services to at least one credit limited wireless subscriber in a plurality of wireless subscribers, the network including at least one home mobile switching center, the home mobile switching center including a home location register, and the network including at least one serving mobile switching center, the serving mobile switching center including a visiting location register; and the network comprising:

telecommunications switches capable of switching telecommunications calls;

mobile phones capable of placing and receiving the telecommunications calls;

at least one national location register coupled with the home mobile switching center, the national location register further coupled with the serving mobile switching center;

wherein the national location register communicates as the visiting location register with the home mobile switching center and as the home location register with the serving mobile switching center;

wherein the national location register receives messages from the home mobile switching center and from the serving mobile switching center; and wherein the national location register transmits roaming information regarding the messages to a roaming server, wherein the roaming server performs real-time call control and credit limited account based billing, based on the roaming information.

7. The network of claim 6, wherein the national location register further comprises:

at least one message processor that receives at least one registration notification message from the serving mobile switching center and that adapts the registration notification message to identify the national location register as the visiting location register with respect to the home mobile switching center and as the home location register with respect to the serving mobile switching center.

8. The network of claim 6, wherein the national location register further comprises:

at least one message processor configured to transmit a termination restriction message to the serving mobile switching center, whereby call termination is restricted at the serving mobile switching center.

9. The network of claim 6, wherein the national location register further comprises:

a database containing information for providing a telephone number unique to a roaming call for routing call originations through a call origination Remote Service Unit.

10. The network of claim 6, wherein the national location register is configured to request a Temporary Location Directory Number from the serving mobile switching center, whereby incoming calls are routed from the home mobile switching center to the serving mobile switching center.

* * * * *